United States Patent [19]
Piers

[11] Patent Number: 5,462,673
[45] Date of Patent: Oct. 31, 1995

[54] CLEANING SYSTEM FOR VIBRATORY SCREENING DEVICES

[75] Inventor: George E. Piers, Houston, Tex.

[73] Assignee: Triton Engineering Services Company, Houston, Tex.

[21] Appl. No.: 167,246

[22] Filed: Dec. 15, 1993

[51] Int. Cl.⁶ .......................... B01D 35/143; B01D 33/48
[52] U.S. Cl. .......................... 210/739; 209/320; 209/346; 209/380; 210/87; 210/139; 210/388; 210/391; 210/791
[58] Field of Search .................... 209/308, 320, 209/322, 346, 380, 325, 326, 329; 210/86, 87, 106, 139, 194, 384, 389, 391, 409, 739, 744, 780, 791, 797, 805, 388, 413; 162/277

[56] References Cited

U.S. PATENT DOCUMENTS

| | | | |
|---|---|---|---|
| 1,381,272 | 6/1921 | Bird | 162/277 |
| 1,945,492 | 1/1934 | Lamort | 210/388 |
| 2,104,785 | 1/1938 | Akeyson | 210/384 |
| 2,730,932 | 1/1956 | McCrystle et al. | 209/380 |
| 3,206,035 | 9/1965 | Hirs | 210/391 |
| 3,263,977 | 8/1966 | Rickard | 261/112 |
| 3,333,700 | 8/1967 | Coleman | 210/391 |
| 3,823,823 | 7/1974 | Dokter et al. | 210/413 |
| 3,833,123 | 9/1974 | Walker | 210/388 |
| 4,459,207 | 7/1984 | Young | 210/384 |
| 4,911,834 | 3/1990 | Murphy | 210/384 |
| 5,100,539 | 3/1992 | Tsutsumi | 209/346 |

FOREIGN PATENT DOCUMENTS

| | | | |
|---|---|---|---|
| 2416043 | 10/1979 | France | 210/384 |
| 2026991 | 1/1990 | Japan | 209/380 |
| 107410 | of 1917 | United Kingdom | 209/380 |
| 2055597 | 3/1981 | United Kingdom | 210/384 |

*Primary Examiner*—Joseph W. Drodge
*Attorney, Agent, or Firm*—Bush, Moseley, Riddle & Jackson

[57] ABSTRACT

A vibratory screen apparatus (10) for the separation of solids has a cleaning system to clean the screen bed (15) of adhering solids, such as matted fibrous materials. A water discharge assembly (52) includes a water dispensing tubular member (60) in which elongate slots (76, 78) are provided to discharge pressurized water in a continuous stream or curtain across the entire width of the screen bed (15). The water dispensing tubular member (60) is mounted on a movable slide (54) for back and forth movement along the length of the screen bed (15) by a sprocket chain (72). An endless belt conveyor (104) has an upper run (108) on which the solid materials are deposited enclosed within a tubular conduit (114) for protection of the solid materials being transported by the conveyer (104).

29 Claims, 5 Drawing Sheets

CLEANING SYSTEM FOR VIBRATORY SCREENING DEVICES

FIELD OF THE INVENTION

This invention relates to vibratory screening devices or shakers, and more particularly to a cleaning system for cleaning the mesh screen of the vibratory screening device.

BACKGROUND OF THE INVENTION

Heretofore, such as illustrated in U.S. Pat. No. 4,911,834 dated Mar. 27, 1990, vibratory screening devices or shakers have been provided for the separation of solids contained in a fluid. The fluid contained solids are moved along a vibratory mesh screen and the particles or solids of a size smaller than the openings in the mesh screen fall through the mesh screen into a collecting area. The larger particles or solids move along the mesh screen and are discharged from a rear end of the mesh screen into a suitable material handling device, such as a conveyor, for transport to a material collecting area.

While the vibratory screening device shown in U.S. Pat. No. 4,911,834 is used primarily in the separation of solids, such as entrained formation cuttings from drilling fluid being circulated in a well, the screening device may be utilized in separating fluid entrained solids from other fluids, such as, for example, separating various solids from waste water in a waste water treatment plant, or separating solids entrained in fluids for cleaning tanks or other receptacles. Thus, this type of fluid entrained solid material being separated from the fluid may vary dependent on the specific use being made of the vibratory screening device. The size of the mesh means would also vary dependent on the type of solid or particulate material desired to be removed or separated from the fluid which normally would be water.

In a waste water treatment plant, the waste water may contain fibrous particles, such as partially dissolved tissue paper, lint from fabric, and human hair which may tend to adhere to or mat over the mesh screen at certain locations to block or clog certain openings in the mesh screen thereby to impede the flow of fluid entrained solids along the mesh screen. It is apparent that other solid or particulate materials may tend to clog openings in the mesh screen, and particularly if the openings in the mesh screen are small.

SUMMARY OF THE INVENTION

The present invention is directed to a cleaning system for cleaning the upper surface of a mesh screen on a vibratory screening device so that particulate or solid materials entrained in a fluid and adhering to the mesh screen, such as by capillary action, are removed to prevent or minimize any clogging or blocking of the openings in the mesh screen. The invention utilizes a cleaning method and device in which a pressurized stream of water is discharged from a water discharge member, such as a pipe, downwardly against the upper surface of the mesh screen and across substantially the entire width of the mesh means to dislodge and separate any matted or mass of solid materials, such as fibrous materials, that are adhering to the mesh screen. The pressurized water dislodges any matted materials sticking or adhering to the mesh screen and urges or washes such materials through the openings in the mesh screen so that movement of the fluid entrained solids along the mesh screen is not impeded or blocked by any collecting mass of particulate material. The water discharge member providing a curtain of water extending laterally across the entire width of the mesh stream is moved back and forth along the length of the mesh screen at predetermined time intervals as determined by sensing or measuring means sensing the clogging or blinding of the screen bed by particulate material. Thus, the high pressure moving curtain of water discharged at a height of around two inches, for example, above the upper surface of the mesh screen dislodges or breaks apart any adhering particulate material to prevent or minimize any clogging or blocking of openings in the mesh screen. The water discharged through the mesh screen is collected in a reservoir beneath the screen for supply by a suitable pump system to the water discharge member for discharge against the upper surface of the mesh screen. The reservoir is substantially smaller than the mesh screen surface, but is of sufficient size to supply adequate water to the pump system.

The solids discharged from the rear or discharge end of the mesh screen are normally transported to a separate remote area. For that purpose, a discharge outlet adjacent the rear end of the mesh screen discharges the solids onto a covered conveyor. The solids are discharged from the rear end of the conveyor to a collection facility, such as a dump container, for transport to a remote area, such as a landfill. The solids are protected by the covered conveyor from outside elements, such as wind and rain.

An object of this invention is to provide a cleaning system for cleaning the mesh screen of a vibratory screening device to prevent or minimize any clogging or blinding of the openings in the mesh screen from solids or fibrous materials adhering to the mesh means.

A further object of this invention is to provide a cleaning system in which a moving curtain of pressurized water across the width of the mesh stream moves back and forth along the length of the mesh screen to dislodge or break up any adhering particulate materials and force the particulate materials through the openings in the mesh screen.

An additional object of this invention is to provide such a cleaning system which is actuated at time intervals as determined by sensing means for sensing the clogging or blocking of the openings in the mesh screen, or alternatively at fixed time intervals.

Another object of the invention is to provide a covered conveyor for receiving the solid materials discharged from the rear end of the mesh screen for transport to a collection container.

Other objects, features and advantages of the invention will be in part apparent and in part pointed out hereinafter in the following specification and drawings.

DESCRIPTION OF THE INVENTION

Figure 1:
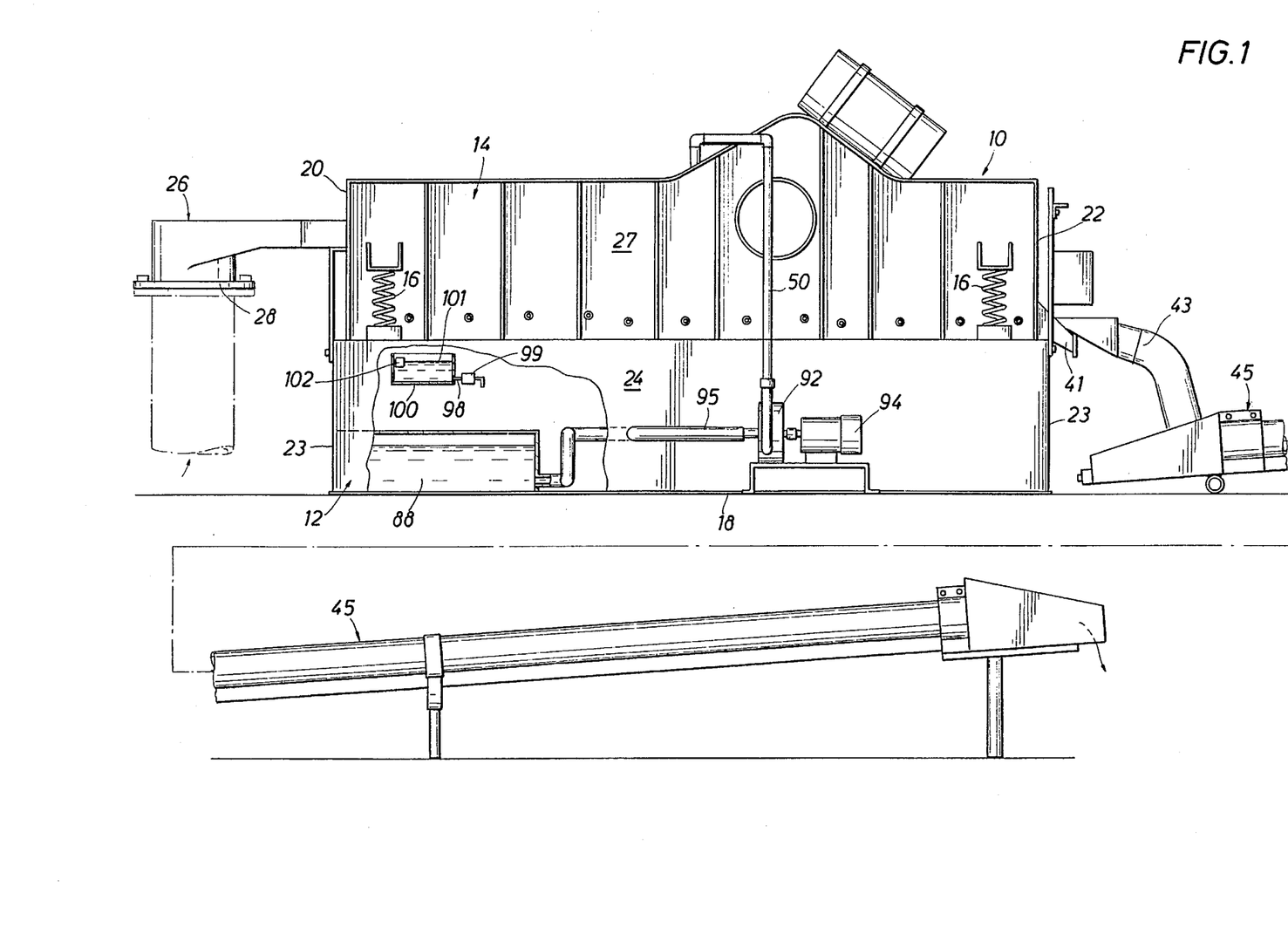
FIG. 1 is a side elevation of the vibratory screening device of the present invention and illustrating conveyor means at the discharge end of the screening device for conveying solids retained by the mesh screen away from the screening device.
Figure 2:
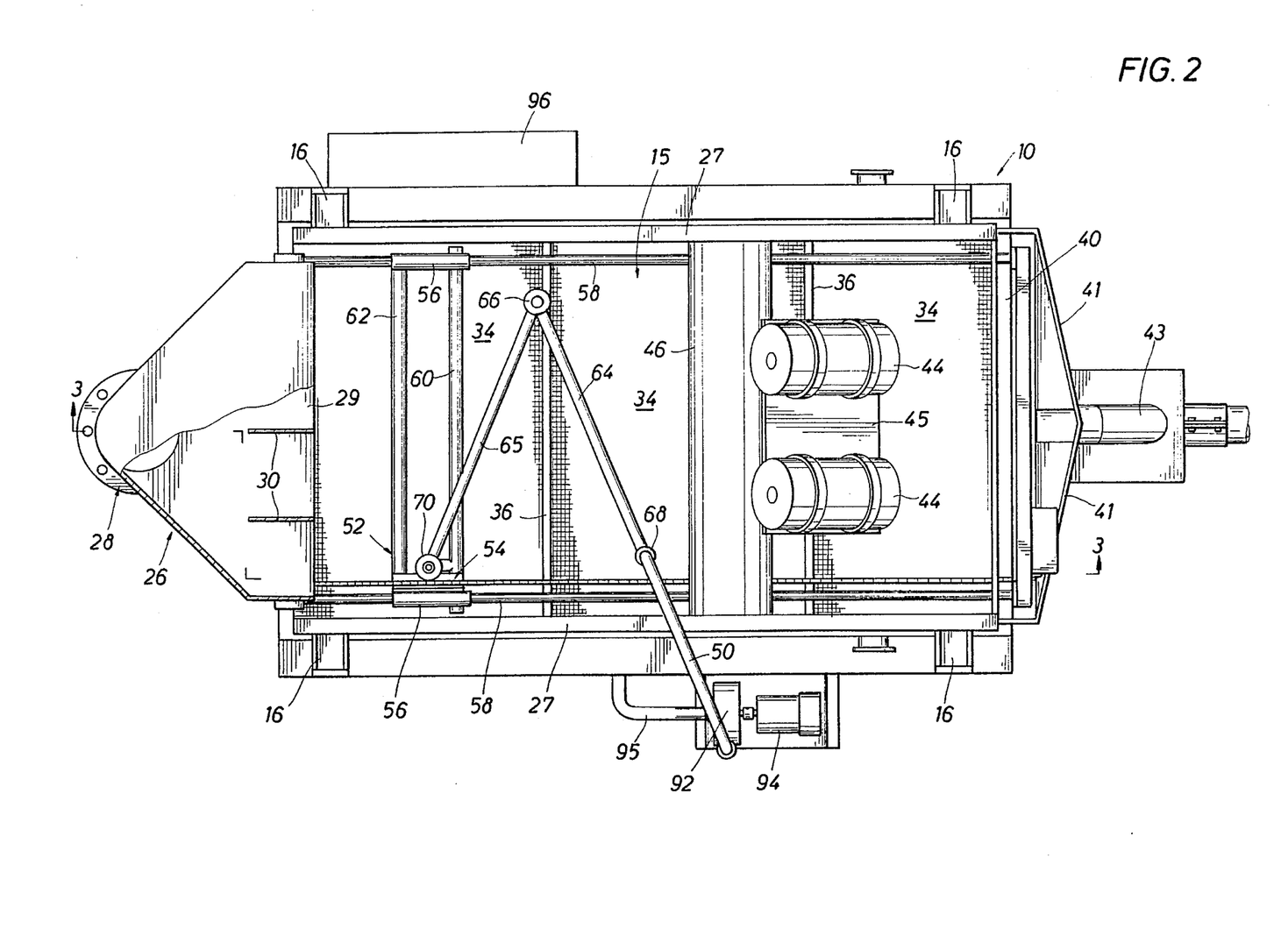
FIG. 2 is a plan view of the vibratory screening device shown in FIG. 1 and showing the water discharge means over the mesh screen mounted for movement along the length of the mesh screen for discharging water downwardly against the mesh screen.
Figure 3:
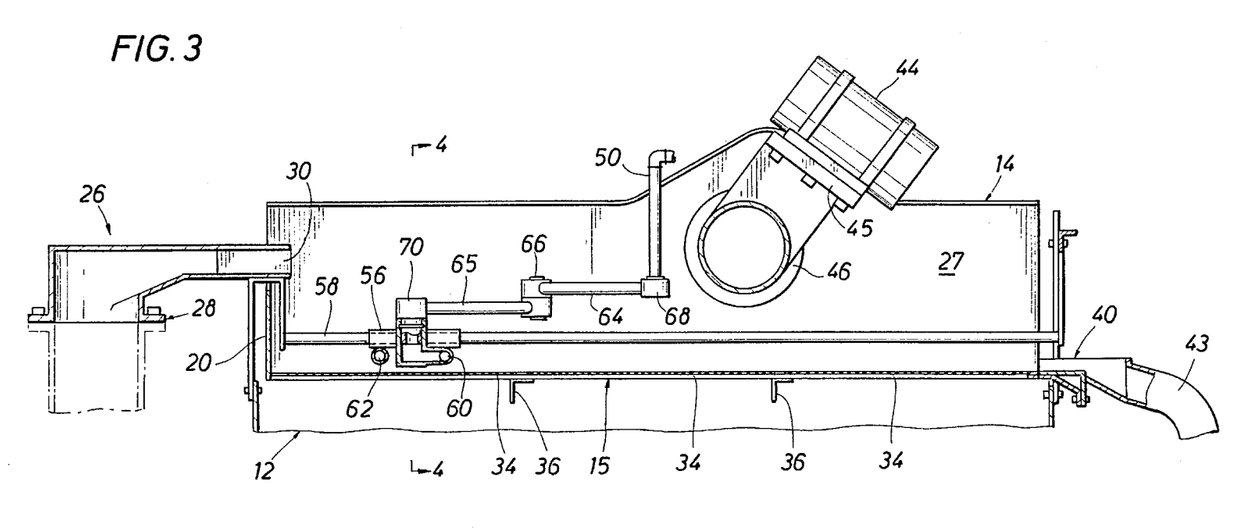
FIG. 3 is a longitudinal sectional view taken generally along line 3—3 of FIG. 2 and showing the water supply means for the downward discharge of water against the mesh screen.

Referring now to the drawings and more particularly to FIGS. 1 and 2, a vibratory screen apparatus or device utilized in combination with the cleaning system of the present invention is illustrated generally at 10. The separation apparatus 10 includes a lower base shown generally at 12 on which is mounted an upper support frame generally indicated at 14 for supporting a mesh screen bed generally indicated at 15 thereon. Support frame 14 is generally rectangular in shape and resiliently mounted on lower base 12 by four spring units 16 positioned adjacent the corners of upper support frame 14 and mounted on brackets to permit vibratory movement of upper support frame 14 relative to lower fixed base 12. Support frame 14 includes opposed sides 27 connected by opposed end walls 20 and 22.

Lower base 12 includes a base plate 18 which may be supported on a supporting surface, such as a ground surface or floor, and a pair of opposed end walls 23 connected to side walls 24. An inlet structure shown generally at 26 includes a lower ranged inlet 28 to receive fluid entrained solids to be separated, such as waste water from a waste water treatment plant, for example. Inlet 28 flares outwardly to a generally rectangular discharge opening 29 in end wall 20 separated by vanes 30. The fluid entrained solids are distributed across the width of the vibratory upper support frame 14. Inlet structure 26 fits within an opening in end wall 20 and the fluid entrained solids are discharged downwardly by gravity onto mesh screen bed 15 across the width of screen bed 15. Upper support frame 14 supports screen bed 15 thereon. Screen bed 15 comprises a plurality of screen panels 34 arranged in end to end relation over which the fluid entrained solids flow. Screen panels 34 are supported on transversely spaced frame members 36 and additional longitudinally extending frame members. Each mesh screen panel 34 includes a wire or plastic mesh material of a predetermined mesh or size to form the screen bed. The mesh size varies depending on the type of fluid entrained materials being separated and may be of a relatively large mesh such as eight openings per inch, or 8 mesh, to a small mesh such as 100 mesh. For waste water, a screen with a mesh of 30 has been found to be satisfactory.

The discharge end of support frame 14 is shown at 40 in FIG. 2. Tapering sides 41 direct the solids being discharged from the upper surface of screen bed 15 to a tubular discharge conduit 43 for discharge onto an endless conveyor device generally indicated at 45 as will be described further. If desired a manually operated jack (not shown) may be provided on opposite sides of discharge end 40 adjacent each of the spring means 16 for raising and lowering the discharge end to a desired positive or negative slope which is dependent, for example, on such factors as the type of materials being screened, the type of fluid, the amount of liquid in the fluid, the type of entrained solids, the degree of viscosity, the screen size, and the particle size. The movement of the materials being separated along screen bed 15 is preferably along a continuous uniform slope either in an upward direction or a downward direction of less than around ten degrees. A zero slope has been found to be satisfactory for waste water at a waste water treatment plant.

Support frame 14 forms a screen shaker for the material being separated and is mounted for vibratory movement relative to fixed base 12. The vibratory means comprises a pair of motor vibrators generally indicated at 44 mounted on a tubular support 46 secured between the opposed sides 27 of upper support frame 14. Motor vibrators 44 are mounted for rotation in opposite directions and have rotational axes positioned at an angular relationship to the horizontal. The rotational speed of motor vibrators 44 may be constant or varied as desired depending on the type and size of the material being separated. It is desirable to have a minimum movement of screen bed 15 while maintaining a specific travel speed of the materials being separated along the screen bed. A movement of screen bed 15 of around 3.5 mils (0.0035 inch) in each direction or a total movement or amplitude of 7 mils (0.0070 inch) has been found to be optimum. An amplitude between around 3 mils and 12 mils will be satisfactory under certain conditions. A generally uniform flow of materials along screen bed 15 is provided. For further details of the vibratory separation system, reference is made to U.S. Pat. No. 4,911,834 dated Mar. 27, 1990, the entire disclosure of which is incorporated herein.

As indicated above, the mesh screen panels 34 of screen bed 15 may be clogged or blocked in certain areas by the accumulation of solid or particulate materials, particularly when the vibratory screen device is utilized for certain uses, such as waste water in a waste water treatment plant where partially dissolved tissue paper and other fibrous materials, such as lint from fabric, may tend to collect or matt over certain areas of screen bed 15 to impede the flow of fluid through screen bed 15. For that purpose, an important part of the present invention is directed to a cleaning system for cleaning or dislodging the collected solid or particulate material from the mesh screen bed 15.

To provide for a discharge of water against the upper surface of the mesh screen panels 34 for cleaning, water is supplied from a fixed water supply line or conduit 50 to a movable water discharge assembly generally indicated at 52. Water discharge assembly 52 includes a movable slide 54 having opposed sleeves 56 mounted about fixed tubular guides 58 for sliding movement. A pair of tubular members 60 and 62 extend between and are secured to opposed sleeves 56. Tubular member 60 is a water discharge conduit while tubular member 62 is a support member for slide 54. Extending between water discharge conduit 60 and fixed supply line 50 are a pair of tubular connecting members 64, 65 pivotally connected to each other at one end thereof about pivot or swivel 66. The other end of connecting member 64 is pivotally connected about a lower pivot 68 to fixed water supply line 50, and the other end of connecting member 65 is pivotally connected at 70 to water discharge conduit 60. Water is supplied from fixed water line 50 to connecting members 64, 65 and to water discharge conduit 60 for discharge.

Figure 4:
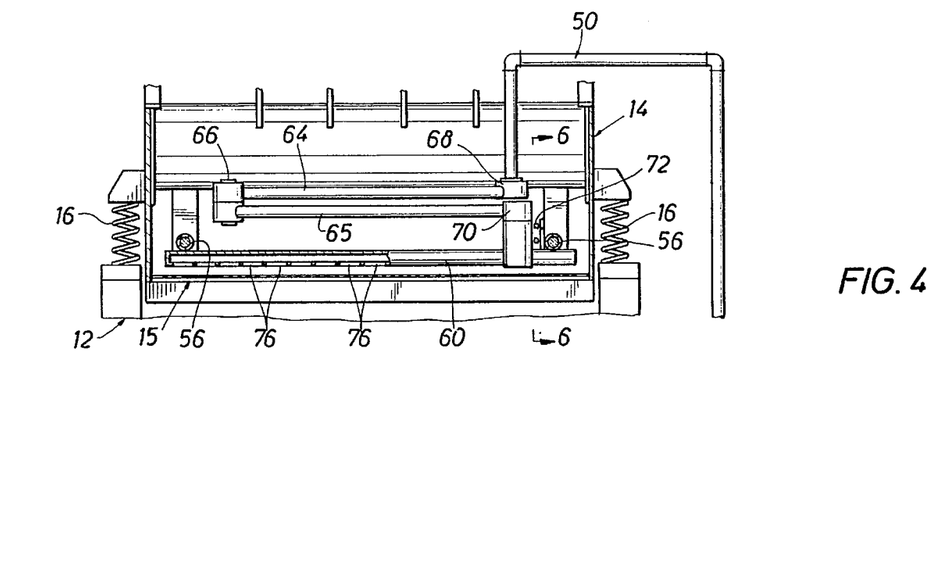
FIG. 4 is a sectional view taken generally along line 4—4 of FIG. 3 illustrating the slotted water discharge conduit for the discharge of pressurized water against the upper surface of the mesh screen across substantially the entire width of the screen.
Figure 5:
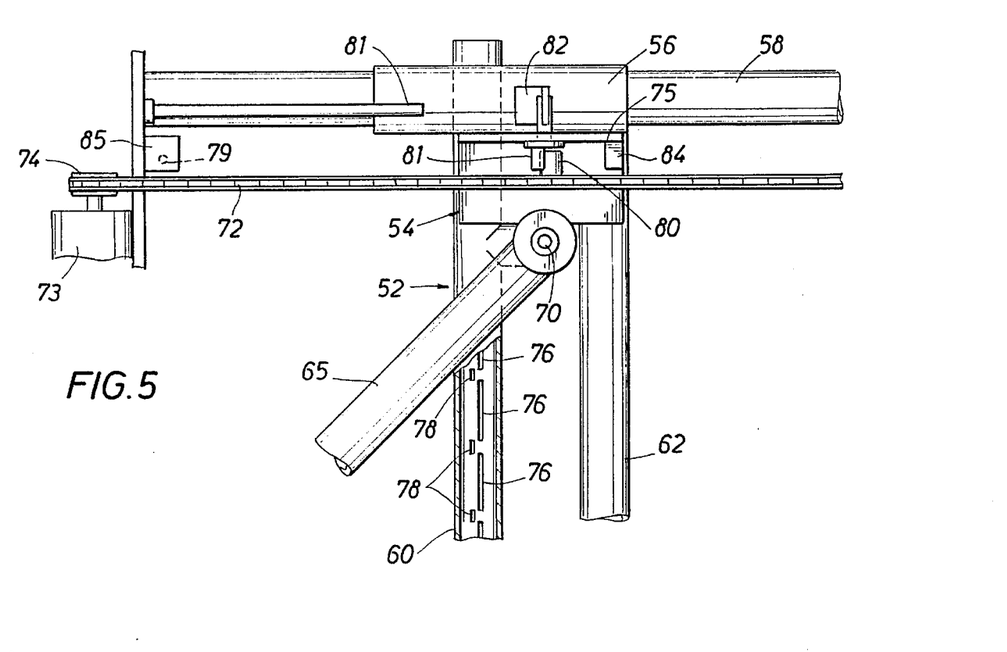
FIG. 5 is a partial top plan of the drive means for moving the water discharge conduit back and forth along the length of the screen and showing the pattern for the elongate discharge slots.

Referring to FIGS. 4 and 5, water discharge conduit 60 is shown mounted on sleeves 56 and has elongate slots 76, 78 arranged in a predetermined pattern to provide for the discharge of a curtain or wall of water in a high pressure stream across the entire width of screen bed 15. As an example of the slot arrangement, discharge conduit 60 of a length around forty-five (45) inches has elongate slots 76 around three inches in length and spaced from each other around ¼ inch. Elongate slots 78 are laterally spaced or offset from adjacent spaced ends of slots 76 around 0.15 inches and are of a length of around ½ inch to form generally a continuation of the stream of water being discharged from slots 76. Elongate slots 76, 78 are preferably positioned at a height of around two inches from the upper surface of screen bed 15. However, satisfactory results may be obtained with slots 76, 78 spaced between around one inch and five inches from screen bed 15 dependent primarily on the size and shape of the slots, and the pressure of the discharged water.

Figure 6:
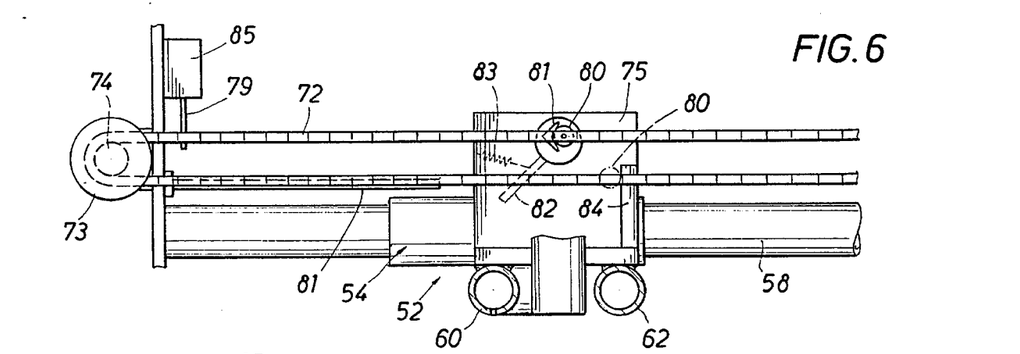
FIG. 6 is taken generally along line 6—6 of FIG. 4 and shows the drive means of FIG. 5 with the water discharge conduit moving along the screen.
Figure 7:
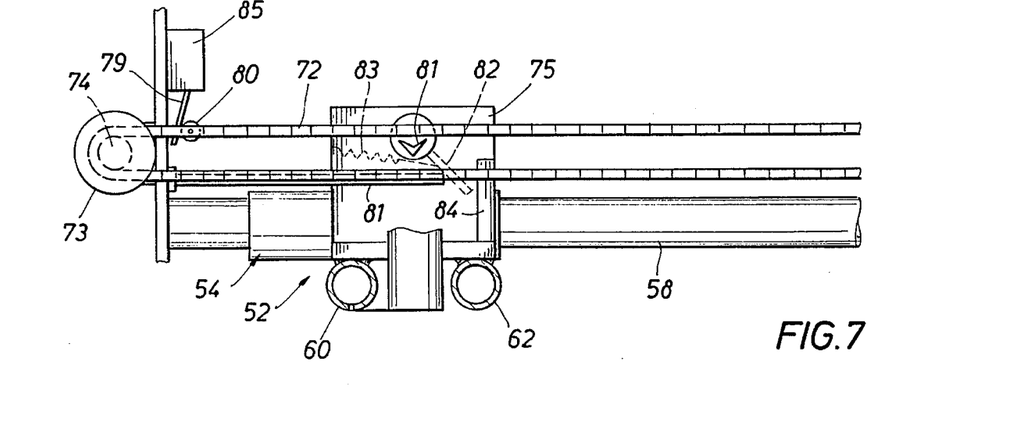
FIG. 7 is a sectional view similar to FIG. 6 but showing the limit switch actuated for stopping the movement of the water discharge conduit.
Figure 8:
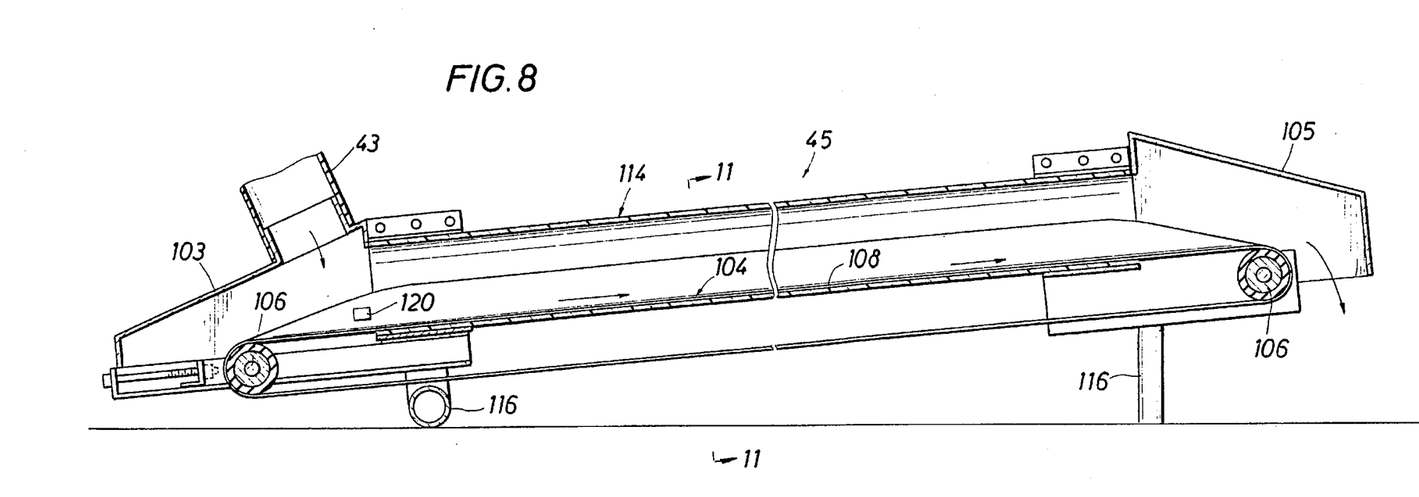
FIG. 8 is a longitudinal sectional view of the conveyor means for receiving the solids from the upper surface of the vibratory screen.
Figure 9:
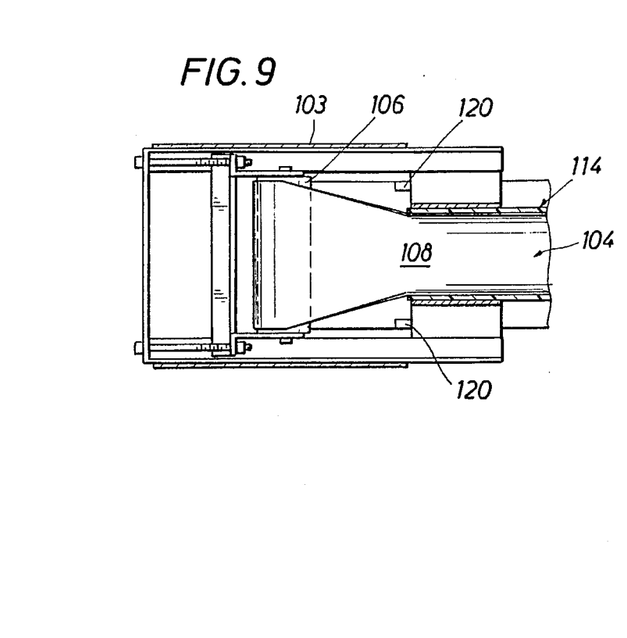
FIG. 9 is a partial top plan with certain parts broken away of the receiving end of the conveyor.
Figure 10:
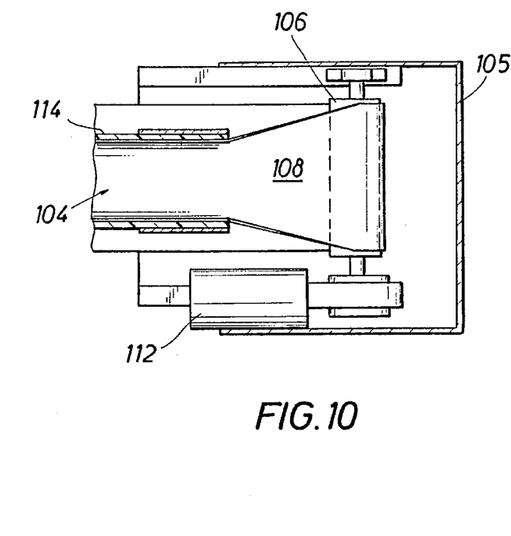
FIG. 10 is a partial top plan with certain parts broken away of the discharge end of the conveyor.

For moving water discharge conduit 60 and slide 54 along tubular guides 58 for the length of screen bed 15, a sprocket chain 72 is mounted about sprockets 74 at opposite ends of guides 58. Slide 54 has a support bracket 75 thereon adjacent chain 72. A motor 73 drives drive sprocket 74 for movement of chain 72. Sprocket chain 72 has a drive pin 80 extending therefrom and a pivoted stop 81 on support bracket 75 engages drive pin 80 for movement of slide 54 along guides 58 and screen bed 15 as shown particularly in FIGS. 5–7. Lever 82 comprises an actuating member for pivoting stop 81 out of engaged position. A spring 83 urges lever 82 and stop 81 to an engaged position with drive pin 80. At the end of a complete cycle adjacent drive sprocket 74, a fixed rod 81 engages lever 82 on pivoted stop 81 to pivot stop 81 out of contact with drive pin 80 as shown in FIG. 7 thereby to stop the movement of slide 54. Drive pin 80 upon further movement engages a prong 79 on a limit switch 85 as shown in FIG. 7 to deenergize motor 73 and stop movement of chain 72. Upon energizing of motor 73 again, another complete cycle is provided. A complete cycle is achieved in around one minute at a speed of around 20 feet per minute with the length of screen bed 15 around ten feet, for example. A speed of between 10 and 30 feet per minute would be satisfactory.

When motor 73 is energized from the position of FIG. 7, drive pin 80 overrides prong 79 and moves to the lower run of sprocket chain 72. Pin 80 then engages a lower stop 84 on slide 54 to move slide 54 to the right as viewed in FIGS. 5–7. When drive pin 80 reaches the opposite end of screen bed 15, drive pin 80 rides off the upper end of stop 84 as it moves around an idler sprocket and then engages pivoted stop 81 adjacent the upper run of sprocket chain 72.

Water is supplied to water supply line 50 from a reservoir 88 on fixed base 12 beneath the front screen panel 34. Reservoir 88 collects water from the passage of water through screen 34. A motor 94 drives pump 92 connected to reservoir 88 by line 95. Excess water collected within base 12 flows from an outlet 96 as shown in FIG. 2 to a predetermined area, such as other facilities in a water treatment plant, for example. If desired, a filter may be provided in line 95.

Water discharge assembly 52 when sprocket motor 73 and pump motor 94 are engaged makes only one complete cycle and then stops. It is desirable to restart water discharge assembly 52 for another cleaning cycle if the openings in mesh screen bed 15 tend to become clogged or blinded. A measuring or sensing device is provided for determining when a subsequent cleaning cycle is to be commenced. For this purpose a rectangular sensing reservoir 100 around six inches by twelve inches in size is positioned centrally of the width of the front screen panel 34 as illustrated in FIG. 1. A discharge line 98 has a discharge valve 99 therein and valve 99 is adjusted so that the amount of water being collected in reservoir 100 is slightly greater than the water being discharged through valve 99 and line 98. When screen bed 15 becomes clogged or blinded, the water discharged through line 98 is greater than the water being collected resulting in a lowering of the water level 101 in reservoir 100. A float switch 102 on water level 101 of reservoir 100 is activated to send a signal to suitable relays for motors 73 and 94 to energize motors 73 and 94 for commencement of another cycle of operation for the cleaning system. Reservoir 100 is again filled by water from the cleaning system. Thus, the flow rate of the water through screen bed 15 is sensed by sensing reservoir 100 and operation of the cleaning system is commenced upon the flow rate decreasing a predetermined amount to provide an automatic operation.

In some instances, it may be desirable to restart water discharge assembly 52 for another cleaning cycle at predetermined time periods. If so, a timer may be provided for energizing motors 73 and 94 at definite time intervals, as may be predetermined. Also, while water discharge assembly 52 has been shown as moving in a direction longitudinally of screen bed 15, it may be desirable under certain conditions to move the water discharge assembly transversely of screen bed 15. Further, an oscillating stream of water under certain conditions may be satisfactory for cleaning screen bed 15.

It is to be understood that a separate supply of water is not required for operation of the cleaning system. Waste water passing through screen bed 15 is collected within reservoir 88 and pump 92 supplies water from reservoir 88 directly to water discharge conduit 60. However, it may be desirable under certain conditions to utilize a separate water source.

Figure 11:
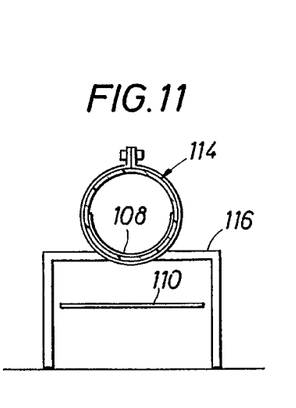
FIG. 11 is a section taken generally along line 11—11 of FIG. 8 and showing the upper run of the conveyor mounted within a tubular guide.

Referring to FIGS. 8–11, endless conveyor device 45 is illustrated. A hood or cover 103 is connected to the lower end of discharge conduit 43 over the receiving end of an endless belt type conveyor generally indicated at 104 for transport of solids to a desired container or area for disposal. A rear hood 105 is positioned over the discharge end of conveyor 104. Endless conveyor 104 extends about rollers 106 and has an upper run 108 and a lower run 110. A motor 112 is connected by suitable gearing to drive roller 106 for rotation of rollers 106 and movement of conveyor 104. A tubular housing 114 extends between front hood 103 and rear hood 105. Upper run 108 of endless conveyor 104 is received within cylindrical housing 114 and conforms to the bottom half of the inner peripheral surface of housing 114 as shown in FIG. 11. Front and rear supports 116 support conveyor 104. Particulate material from screen bed 15 is deposited on the upper run 108 of endless belt 104 adjacent the inlet end of housing 114 beneath hood 103. Upper run 108 of endless conveyor 104 is covered by hoods 103, 105 and housing 114. Thus, any solids being transported by conveyor 104 are protected from rain, wind or other external elements. The particulate material on upper run 108 is discharged downwardly beneath hood 105 into a lower container (not shown) for transport to a remote disposal area such as a land fill facility for example.

It is not necessary to operate conveyor 104 continuously as solids from screen bed 15 do not fill conveyor 104. Thus, motor 112 of conveyor 104 is deenergized to operate in increments, such as two foot increments for example. For this purpose, a sensor 120 is positioned beneath hood 103 and near the upper run 108 of conveyor 104. When sensor 120 detects sufficient solids deposited on upper run 108, a suitable relay for motor 112 is actuated to energize motor 112 and move conveyor 104 a distance sufficient to clear sensor 120 with motor 112 then being deenergized. Sensor 120 may, for example, comprise a photoelectric cell or an electrical capacitance device.

From the foregoing, a cleaning system for a vibratory mesh screening device has been provided in which a pressurized curtain of water extending across the screen bed moves back and forth along the screen bed in a cycle to dislodge any adhering or matted particulate material being moved along the screen bed and force any small particulate material through the openings in the mesh screen. One complete cycle of the movable curtain of water is sufficient for effective cleaning of the screen bed. The cleaning device is actuated automatically when clogging of the screen bed is sensed. The fluid utilized for the cleaning operation is obtained from the water entraining the particulate material, which is recirculated.

While the cleaning device has been illustrated primarily for waste water, such as a municipal waste water treatment plant, it is to be understood that the present invention can be utilized in most installations where a shaker or screening device is provided for the separation of fluids from fluid entrained solids, such as the separation of drilling fluids from entrained formation cuttings, or separating solids entrained in fluid for cleaning tanks or other receptacles.

It now will be recognized that a new and improved cleaning system for vibratory screening devices has been disclosed which meets all of the objectives of the present invention, and which incorporates numerous unique features and advantages as set forth herein. Since certain changes or modifications may be made in the disclosed embodiments without departing from the inventive concepts involved, it is the aim of the appended claims to cover all such changes and modifications falling within the true spirit and scope of the present invention.

What is claimed is:

1. A vibratory screening apparatus comprising:

a vibratory mesh screen bed extending in a planar direction for movement of fluid entrained solids along the length of said screen bed for separation of solids from said fluid;

water dispensing means extending over said screen bed, said water dispensing means including openings of a predetermined size for the downward discharge of water against said screen bed;

water supply means to supply pressurized water to said water dispensing means for the discharge of water in a stream against said screen bed; and means to move said water dispensing means in a translatory movement parallel to the plane of said screen bed and relative to said screen bed as fluid entrained solids are moved along said screen bed for dislodging of solids adhering to said screen bed; said means to move effecting movement of said water dispensing means over substantially the entire surface area of said screen bed along a plane substantially parallel to the plane of said screen bed to maintain said stream of water at a uniform distance from said screen bed during travel of said water dispensing means over said screen bed.

2. A vibratory screening apparatus as set forth in claim 1:

said water dispensing means including openings arranged in a pattern to provide a high pressure curtain of water extending generally continuously across said screen bed, said high pressure curtain of water urging small size solids through the openings in said screen bed for dislodging of any solids collecting on said screen bed.

3. A vibratory screening apparatus as set forth in claim 2:

said water dispensing means including a plurality of elongate slots aligned generally in end to end relation across the width of said screen bed for providing said high pressure curtain of water.

4. A vibratory screening apparatus as set forth in claim 3:

said water supply means including a reservoir for the collection of water passing through said screen bed from said fluid entrained solids; and wherein a pump is operatively connected to said reservoir to supply water to said water dispensing member.

5. A vibratory screen apparatus as set forth in claim 1 wherein:

a solids discharge structure is provided adjacent a rear end of said screen bed to receive solids from an upper surface of said screen bed; and conveyor means are provided beneath said solids discharge structure to receive solids therefrom for transport to a predetermined location.

6. A vibratory screen apparatus as set forth in claim 5 wherein:

said conveyor means comprises an endless belt conveyer having upper and lower runs with said upper run adapted to receive solids for transport; and a tubular member receives said upper run in an enclosed relation to protect the solids thereon, said tubular member supporting said upper run therein.

7. In combination with a vibratory separation apparatus having a vibratory mesh screen extending in a planar direction and opposed sides alongside said screen for movement of fluid entrained solids along said screen for separation of said solids; a screen cleaning device for said apparatus comprising:

water supply means extending over said screen for the downward discharge of water in a stream against the screen and solids thereon;

means to move said water supply means along said screen in a plane generally parallel to the plane of said screen and over substantially the entire surface area of said screen as fluid entrained solids are moved along said screen to maintain said stream of water at a uniform distance from said screen during travel of said water supply means over said screen; and means to stop said water supply means when said water supply means moves over substantially the entire surface area of said screen.

8. The combination as set forth in claim 7;

said water supply means comprising a tubular member extending generally across the width of said screen and having a predetermined pattern of discharge openings for providing a stream of water against said mesh screen for substantially the entire width of said screen.

9. The combination as set forth in claim 8;

said tubular member comprising a plurality of elongate slots positioned in a predetermined pattern to provide a generally continuous stream of water across the width of said mesh screen for urging of solids smaller than the openings in said mesh screen through said openings.

10. The combination as set forth in claim 7;
said water supply means comprising:
a fixed water supply outlet adjacent said mesh screen;
a tubular member extending generally across the width of said screen and having a predetermined pattern of discharge openings therein for providing a stream of water against said mesh screen for substantially the entire width of said screen; and
movable water conduit means between said fixed water supply outlet and said tubular member for maintaining a supply of water therebetween while permitting movement of said tubular member back and forth along the length of said mesh screen relative to said fixed water supply outlet.

11. A vibratory screening apparatus particularly adapted for the separation of fluids from water entrained solids; said screen apparatus comprising:
a lower fixed base;
an upper screen support frame resiliently mounted on said lower base and having a mesh screen bed thereon with an upper surface extending in a generally horizontal plane;
means to vibrate said upper screen support frame for movement of water entrained solids along the length of said screen bed for separation of solids from said water;
a tubular water dispensing member extending generally across said screen bed, said water dispensing member including openings of a predetermined size for the downward discharge of water in a stream against said screen bed during operation thereof for cleaning said screen bed;
means for selectively moving said tubular water dispensing member in a generally horizontal direction over substantially the entire upper surface of said mesh screen bed in a plane parallel to the plane of said screen bed during operation thereof to maintain said stream of water at a uniform distance from said screen bed during travel of said water dispensing member in a generally horizontal direction;
water supply means including a reservoir; and
a pump operatively connected to said reservoir to supply water to said water dispensing member for the discharge of water across said screen bed during operation of said water dispensing member.

12. A vibratory screening apparatus as set forth in claim 11 wherein said openings in said water dispensing member comprises a plurality of elongate slots spaced at intervals along the length of said tubular water dispensing member.

13. A vibratory screening apparatus as set forth in claim 12 wherein said slots are spaced from said mesh screen bed a uniform distance between around one and five inches.

14. A vibratory screening apparatus as set forth in claim 11 wherein:
said reservoir is positioned adjacent said screen bed and collects water from water passing through said screen bed, said water supply means supplying water to said water dispensing member at predetermined intervals during operation of said vibratory screening apparatus.

15. A vibratory screening apparatus as set forth in claim 11 wherein:
sensing means are provided to sense the clogging of said mesh screen bed; and
means responsive to said sensing means effect actuation of said water supply means supplying water to said water dispensing member for the discharge of water against said mesh screen bed for cleaning of said bed.

16. A vibratory screening apparatus as set forth in claim 15 wherein said sensing means comprises a sensing reservoir beneath said screen bed for sensing the flow of water through said screen, said sensing means being actuated upon a decrease in the water level within said sensing reservoir below a predetermined level to effect actuation of said water supply means.

17. A method for cleaning a planar vibratory mesh screen of a separation device in which fluid entrained solids are moving along the vibrating mesh screen comprising the following steps:
providing a supply of water for cleaning said vibratory mesh screen;
providing water discharge means above said screen;
discharging water from said water discharge means in a stream downwardly against said vibratory mesh screen; and
moving said water discharge means during discharge of water therefrom along said mesh screen in a plane parallel to said mesh screen to maintain said stream at a uniform distance from said mesh screen during travel thereof over the screen for washing small solids through said screen.

18. A method for cleaning at predetermined intervals a planar vibratory mesh screen of a separation device in which fluid entrained solids are moving along the vibrating mesh screen, said method comprising the following steps:
providing a supply of water for cleaning said vibratory mesh screen;
providing water discharge means above said screen;
discharging water from said water discharge means downwardly in a stream against said vibratory mesh screen at said predetermined intervals;
moving said water discharge means in a plane parallel to said mesh screen to maintain said stream at a uniform distance from said mesh stream during travel thereof over said screen;
supplying water to said water discharge means at predetermined intervals during operation of said separation device;
providing means for sensing the flow rate of water through said vibratory mesh screen and providing an output signal upon the flow rate decreasing a predetermined amount; and
providing means responsive to said output signal for actuating said water discharge means for discharging water against said vibratory mesh screen to clean said mesh screen during operation of said separation device.

19. A method of separating entrained solid matter from the waste water of a waste water treatment plant as part of a treatment process; said method comprising the following steps:
providing a vibratory screening apparatus having a fixed support structure and a vibratory screen bed mounted thereon, the vibratory screen bed having an upper surface in a generally horizontal plane for relative vibratory movement;
discharging said water containing said solid matter onto the upper surface of said screen bed;
vibrating said screen bed at a predetermined vibratory movement to move said solid matter above a predetermined minimum size along the upper surface of said screen bed;

discharging a separate pressurized stream of water onto said screen bed during vibratory movement of said screen bed over substantially the entire upper surface of said screen bed for washing said solid matter moving along the upper surface of said screen bed and minimizing any adherence of solid matter on the screen bed, said solid matter below a predetermined size and water passing through said screen bed;

moving said pressurized stream of water in a generally horizontal plane parallel to said screen bed while being discharged onto said screen bed;

discharging said water and solid matter passing through said screen bed; and discharging solid matter moving along the upper surface of said screen bed from a discharge area of said screen bed.

20. A method of separating entrained solid matter from the influent water of a waste water treatment plant as set forth in claim 19 including the steps of:

discharging said separate pressurized stream of water onto said screen bed for a predetermined time period; and stopping the discharge of said separate pressurized stream after said predetermined time period.

21. A method of separating entrained solid matter from the influent water of a waste water treatment plant as set forth in claim 19 includes the step of intermittently discharging said separate pressurized stream of water onto said screen bed during vibratory movement of said screen bed.

22. A method of separating entrained solid particles from waste water at a water treatment plant comprising the following steps:

providing a vibratory screen apparatus having a lower fixed base and an upper vibratory screen bed mounted thereon for relative vibratory movement, the vibratory screen bed having an upper surface in a generally horizontal plane;

discharging waste water containing said solid particles from a waste water conduit of said plant directly onto a receiving end of the upper surface of said screen bed, the screen bed having a mesh screen of a predetermined size;

vibrating said mesh screen relative to said lower fixed base at a predetermined vibratory movement for movement of said solid particles above a predetermined minimum size along the upper surface of said screen bed, the waste water and solid particles below a predetermined size passing through the mesh screen;

discharging waste water and solid particles passing through the mesh screen for flow to another facility of the treatment plant;

discharging a separate pressurized stream of water onto said screen bed during vibratory movement of said screen bed for washing the solid particles entrained with the waste water and assisting in passing the solid particles below a predetermined minimal size through the mesh screen; and moving said stream of water while being discharged in a generally horizontal plane parallel to said screen bed.

23. A method of separating entrained solid particles and waste water at a water treatment plant as set forth in claim 22 including the step of:

discharging a separate pressurized stream of water onto said screen bed during vibratory movement of said screen bed for washing the solid particles entrained with the waste water and assisting in passing the solid particles below a predetermined minimal size through the mesh screen; and moving said stream of water over substantially the entire upper surface of said screen bed.

24. A method of separating solid particles from waste water at a water treatment plant as set forth in claim 23 including the steps of:

collecting waste water passing through said screen bed in a lower collection chamber beneath said screen bed; and returning waste water from said lower chamber for discharge in said separate pressurized stream of water.

25. A method of separating solid particles from waste water at a water treatment plant as set forth in claim 22 including the step of:

providing an endless conveyor at the discharge end of said screen bed to receive solid particles therefrom;

providing a cover over the upper run of said endless conveyor for said solid particles; and discharging said solid particles from said screen bed onto said endless conveyor for travel to a predetermined location.

26. A vibratory screening apparatus comprising:

a vibratory mesh screen bed for movement of fluid entrained solids along the length of said screen bed for separation of solids from said fluid;

a water dispensing member extending over said screen bed, said water dispensing member including openings of a predetermined size for the downward discharge of water against said screen bed;

water supply means to supply pressurized water to said water dispensing member for the discharge of water in a stream against said screen bed;

means to move said water dispensing member relative to said screen bed as fluid entrained solids are moved along said screen bed for dislodging of solids adhering to said screen bed; said means to move comprising a sprocket chain operatively connected to said water dispensing member for moving said water dispensing member back and forth along the length of said screen bed in a cycle of operation; and means operatively connected to said sprocket chain to stop movement thereof upon the completion of one complete cycle of operation.

27. In combination with a vibratory separation apparatus having a vibratory mesh screen and opposed sides alongside said screen for movement of fluid entrained solids along said screen for separation of said solids; a screen cleaning device for said apparatus comprising:

water supply means extending over said screen for the downward discharge of water against the screen and solids thereon;

means to move said water supply means along said screen as the fluid entrained solids are moving along said screen;

a solids discharge structure adjacent the end of said mesh screen to receive solids from said mesh screen, said discharge structure having sides tapering inwardly from the end of said mesh screen to a discharge outlet;

conveyor means connected to said discharge outlet for transport of said solids to a predetermined location;

said conveyor means comprising an endless belt conveyor having upper and lower runs with said upper run adapted to receive solids for transport; and a tubular member receiving and enclosing said upper run to protect the solids thereon, said tubular member having an inner peripheral surface supporting said upper run.

28. A vibratory screening apparatus particularly adapted for the separation of solids from waste water; said screen apparatus comprising:

a lower fixed base;

an upper screen support frame resiliently mounted on said lower base and having a mesh screen bed thereon;

means to vibrate said upper screen support frame for movement of waste water entrained solids along the length of said screen bed for separation of solids from said waste water;

a tubular water dispensing member extending above said screen bed, said water dispensing member including openings of a predetermined size for the downward discharge of water against said screen bed;

water supply means to supply pressurized water to said water dispensing member for the discharge of water in a stream against said screen bed; said water supply means including a reservoir for the collection of water passing through said screen bed from said waste water, a fixed water supply outlet adjacent said screen bed, and movable water conduit means between said fixed water supply outlet and said water dispensing member for maintaining a supply of water therebetween;

means to move said water dispensing member along said screen bed as the waste water entrained solids are moving along said screen bed; and a pump operatively connected to said reservoir to supply water to said water dispensing member;

said movable water conduit means comprising a pair of tubular members pivotally connected to each other, one of said tubular members being pivotally connected to said fixed water supply outlet and the other tubular member being pivotally connected to said water dispensing member.

29. A vibratory screen apparatus as set forth in claim 28 wherein:

a pair of spaced parallel guides extend along opposed sides of said screen bed; and means for mounting said tubular water dispensing member for sliding movement along said spaced guides.

* * * * *